United States Patent [19]

Kobayashi et al.

[11] Patent Number: 4,660,879
[45] Date of Patent: Apr. 28, 1987

[54] AIR SPOILER APPARATUS WITH SOLAR CELLS FOR VEHICLE

[75] Inventors: Toshiki Kobayashi; Akira Fukami, both of Okazaki; Junzi Mizuno, Nishio; Hideaki Sasaya, Okazaki, all of Japan

[73] Assignee: Nippon Soken, Inc., Nishio, Japan

[21] Appl. No.: 729,856

[22] Filed: May 2, 1985

[30] Foreign Application Priority Data

May 4, 1984 [JP] Japan .................... 59-89899

[51] Int. Cl.⁴ ............................................. B62D 35/00
[52] U.S. Cl. ..................................... 296/1 S; 180/2.2; 180/65.3; 180/903; 244/213; 136/246; 136/291
[58] Field of Search ................. 296/1 S, 91, 211, 215; 136/291, 246; 244/203, 213, 53 R, 58, 2.2, 65.3, 903

[56] References Cited

U.S. PATENT DOCUMENTS

| | | | |
|---|---|---|---|
| 2,383,102 | 8/1945 | Zap | 244/213 |
| 3,455,594 | 7/1969 | Hall et al. | 296/1 S |
| 3,696,286 | 10/1972 | Ule | 323/15 |
| 4,031,385 | 6/1977 | Zerlaut et al. | 250/203 R |
| 4,181,188 | 1/1980 | Dessert | 180/2.2 |
| 4,199,894 | 4/1980 | Fisher | 46/17 |
| 4,223,214 | 9/1980 | Dorian et al. | 250/203 R |
| 4,278,922 | 7/1981 | Grebe | 180/289 |

FOREIGN PATENT DOCUMENTS

| | | | |
|---|---|---|---|
| 2820628 | 11/1979 | Fed. Rep. of Germany | 180/2.2 |
| 3044586 | 5/1982 | Fed. Rep. of Germany | 296/211 |
| 68422 | 5/1980 | Japan | 296/97 R |
| 32521 | 2/1984 | Japan | 296/211 |

OTHER PUBLICATIONS

Science Newsfront Article, Popular Science, Feb. 1983.

*Primary Examiner*—Robert B. Reeves
*Assistant Examiner*—Dennis H. Pedder
*Attorney, Agent, or Firm*—Cushman, Darby & Cushman

[57] ABSTRACT

An air spoiler apparatus with solar cells includes an air spoiler wing mounted on an outer surface of a vehicle body, solar cells mounted on an upper surface of the air spoiler wing, a running detector for detecting a running state of a vehicle, and an elevation angle adjustment unit of the air spoiler wing. The air spoiler elevation angle adjustment unit adjusts an elevation angle of the air spoiler wing within select angular ranges to increase power generation efficiency of the solar cells during parking, stopping, low-speed or high speed running represented by the running state detected by the running detector. During high speed operation the angular range is restricted to an optimum range for aerodynamic efficiency.

6 Claims, 15 Drawing Figures

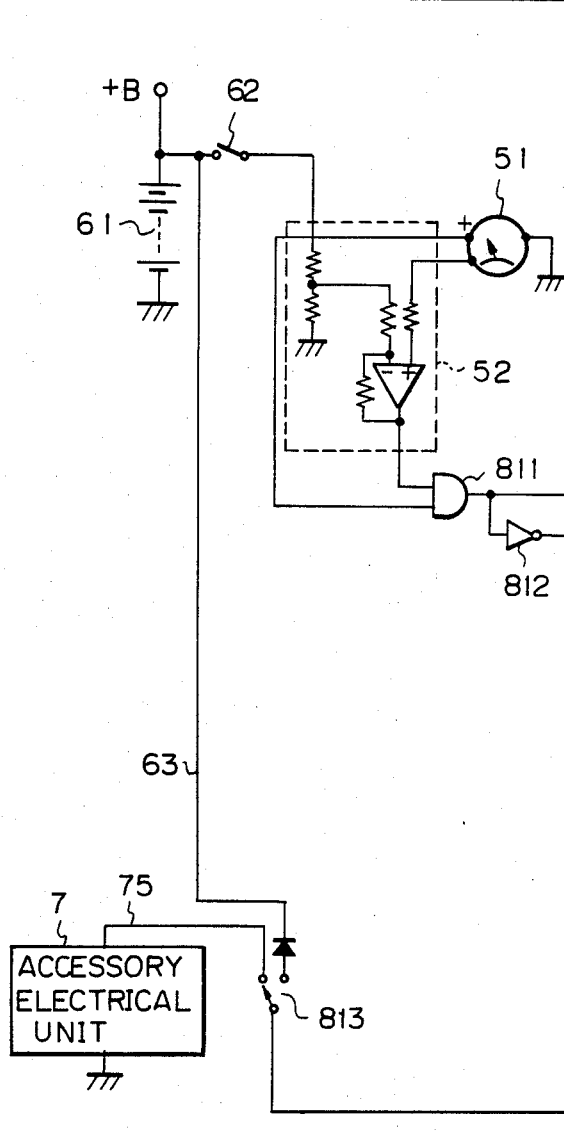

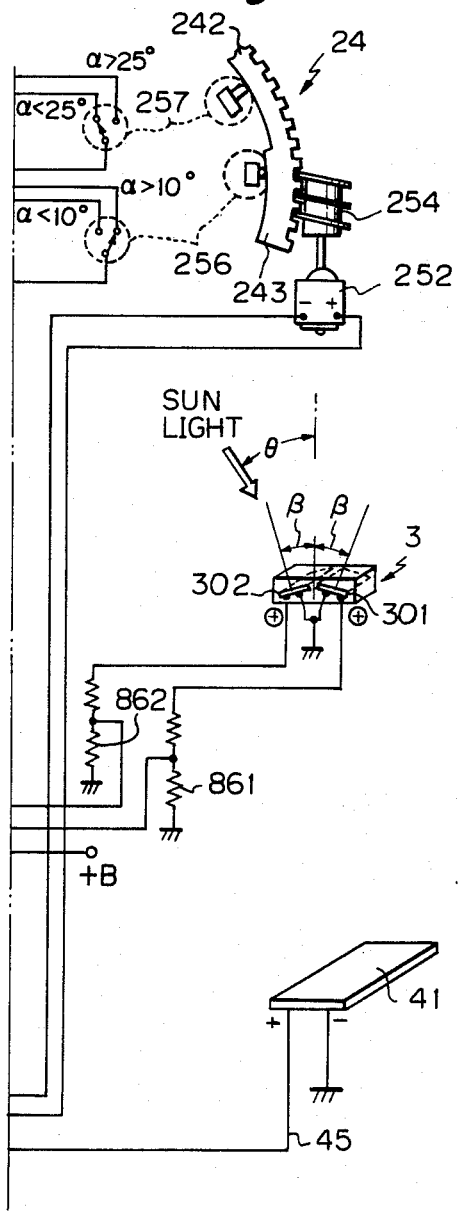

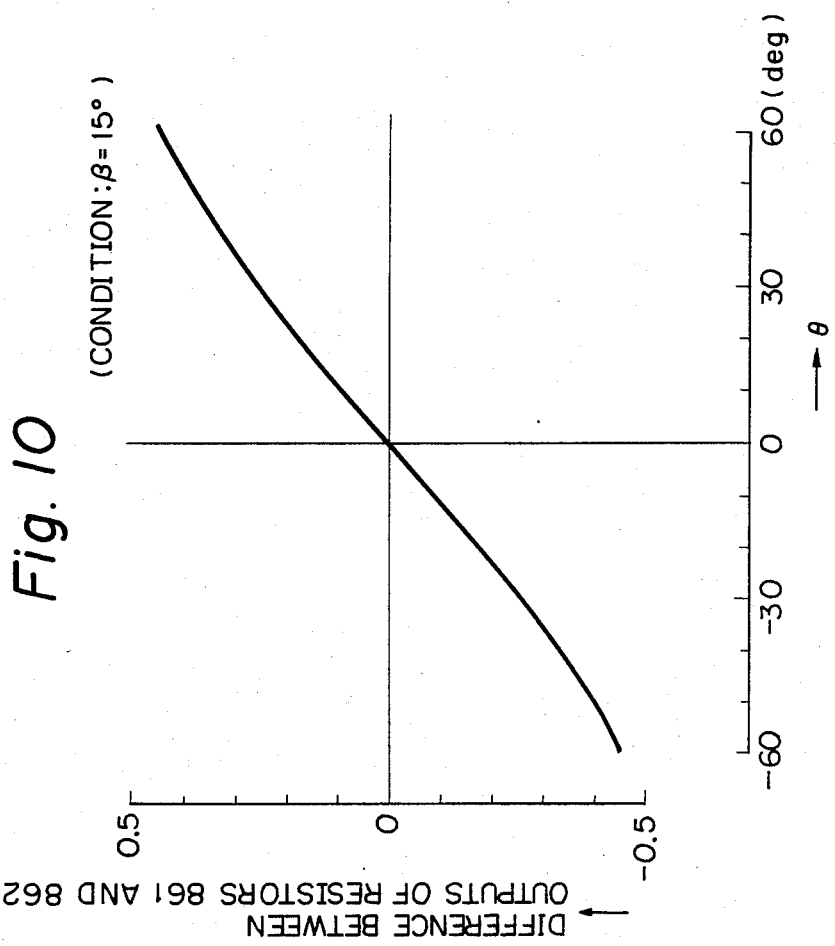

AIR SPOILER APPARATUS WITH SOLAR CELLS FOR VEHICLE

BACKGROUND OF THE INVENTION

1. Field of the Invention

The present invention relates to an air spoiler mounted on an outer surface of a body of a vehicle such as an automobile to improve aerodynamic characteristics.

2. Description of the Prior Art

A conventional air spoiler mounted on a vehicle body adjusts an airstream therearound to improve aerodynamic characteristics such as drift and lift acting on the vehicle body, thereby stabilizing the steering characteristics and increasing contact pressure between the wheels of the vehicle and the ground. A decrease in the drift coefficient lowers fuel consumption, and a decrease in the lift coefficient provides safer high-speed running.

When solar cells are mounted on such an air spoiler, the relative angle between the solar cells and the sunlight changes in accordance with the orientation of the vehicle and the position of the sun. As a result, the power generating efficiency of the solar cells is degraded.

SUMMARY OF THE INVENTION

It is an object of the present invention to allow adjustment of an air spoiler to an angle corresponding to optimal aerodynamic characteristics during relatively high-speed running, during which the vehicle aerodynamic characteristics are important, and at an optimal angle that will optimize the power generating efficiency of the solar cells mounted on the air spoiler during parking or low-speed running.

According to the present invention, there is provided an air spoiler apparatus including an air spoiler body mounted on an outer surface of a vehicle body, solar cells mounted on the air spoiler body to generate power through the reception of sunlight, a running detection unit for detecting a running state of a vehicle, and an elevation angle adjusting unit for increasing or decreasing an elevation angle of the air spoiler body in a direction that will increase the power generating efficiency of the solar cells during parking and low-speed running in accordance with the running state detected by the running detection unit.

BRIEF DESCRIPTION OF THE DRAWINGS

FIGS. 9A–9C are a circuit diagram showing an arrangement of a control circuit of the air spoiler apparatus of FIG. 1;

FIG. 10 is a graph showing the output voltage of a photosensor as a function of the incident angle of sunlight.

DETAILED DESCRIPTION OF THE PREFERRED EMBODIMENTS

Figure 1:
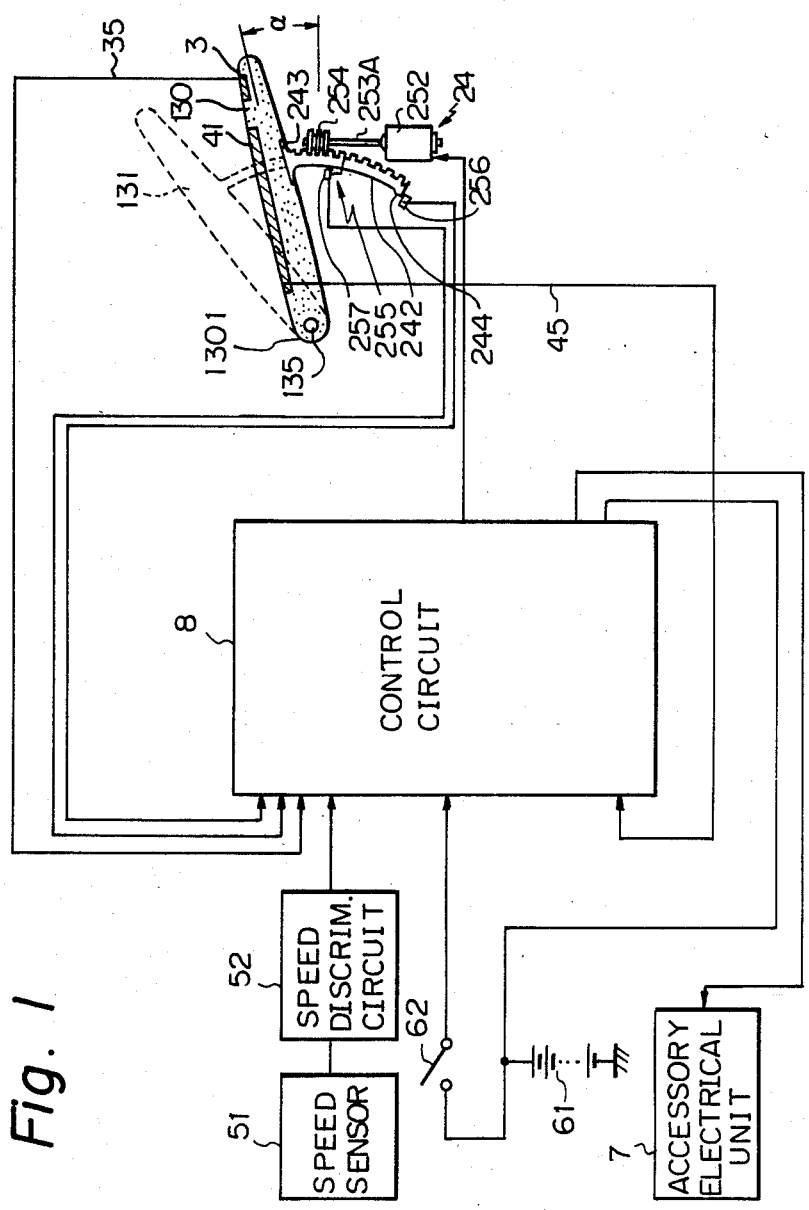
FIG. 1 is a schematic diagram showing an air spoiler apparatus with solar cells according to an embodiment of the present invention.
Figure 2:
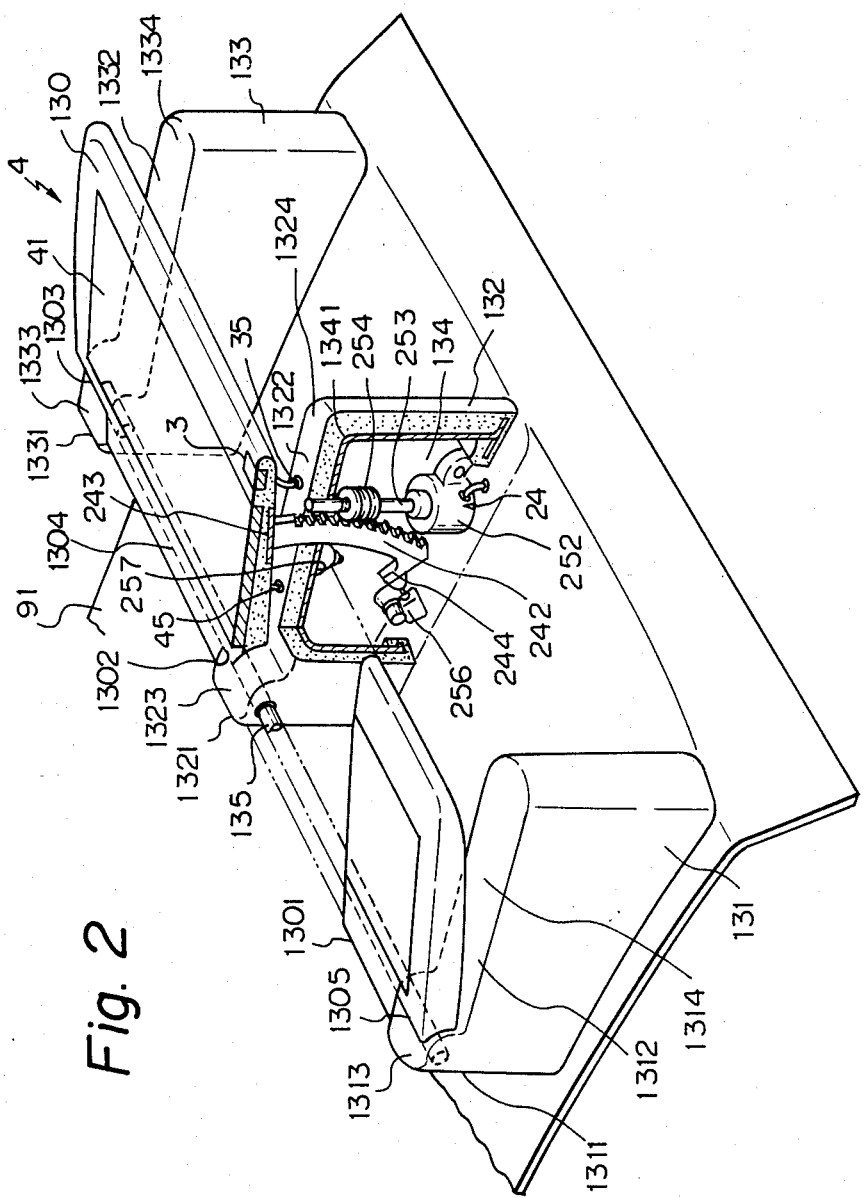
FIG. 2 is a partially sectional perspective view showing an air spoiler of the apparatus shown in FIG. 1.
Figure 3:
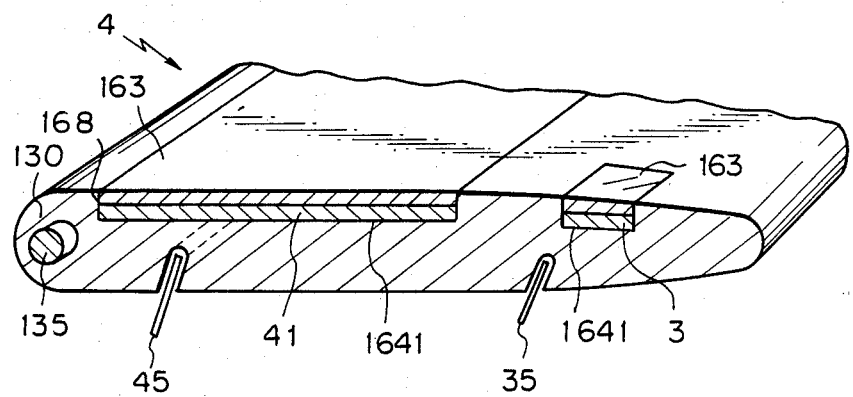
FIG. 3 is a sectional perspective view of an air spoiler wing of the air spoiler shown in FIG. 2.
Figure 4:
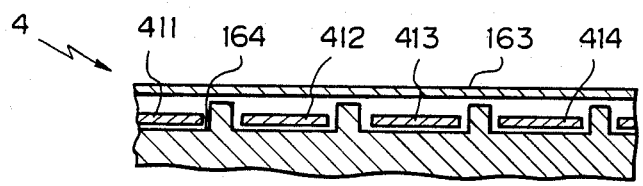
FIG. 4 is a sectional view showing the main part of the air spoiler wing of FIG. 3.

FIG. 1 shows an air spoiler apparatus with solar cells according to an embodiment of the present invention. FIGS. 2, 3 and 4 are schematic views for explaining the structure of an air spoiler of the apparatus of FIG. 1. Namely, FIGS. 2 to 4 show a rear spoiler as an air spoiler which is mounted on a trunk lid of the vehicle and whose elevation angle can be adjusted.

Reference numeral 51 denotes a vehicle speed sensor for detecting a vehicle speed during driving of the vehicle. The vehicle speed sensor 51 generates vehicle speed pulses with a frequency proportional to the vehicle speed. The vehicle speed sensor 51 constitutes a running detection means. Reference numeral 52 denotes a vehicle speed discriminator for discriminating that the vehicle speed detected by the vehicle speed pulses is lower than a predetermined speed. The vehicle speed discriminator 52 discriminates vehicle running states, from parking to low-speed driving. Reference numeral 62 denotes an engine key switch for generating a discrimination signal while an ignition terminal is deenergized.

The rear spoiler has a wing-shaped section and is fixed on the rear end portion of a trunk lid 91 at the two ends and center thereof in such a manner that it extends upward along the longitudinal direction of the vehicle. Front edges 1311, 1321, and 1331 of upper end surfaces 1312, 1322, and 1332 extend slightly upward with respect to the rear edges thereof and constitute hinges 1313, 1323, and 1333, respectively. The rear spoiler also comprises: three supports 131, 132, and 133 having wing seat surfaces 1314, 1324, and 1334 which are inclined upward from the hinges to the rear edges, respectively; a rod-like pivot shaft 135 commonly extending through the front edges 1311, 1321, and 1331 of the supports 131, 132, and 133; a substantially rectangular air spoiler wing 130 hinged at a front edge 1301 through the pivot shaft 135; and an elevation angle adjusting mechanism 24 which receives an input signal from a photosensor 3 mounted on the surface of the wing 130 to increase/decrease the elevation angle $\alpha$.

The inner portion of the air spoiler wing 130 is made of a light molded material such as soft foamed urethane. The outer surface of the wing 130 is made of a rigid material such as fine urethane. Notches 1305, 1302, and 1303 respectively corresponding to the hinges 1313, 1323 and 1333 of the supports 131, 132, and 133 are formed in the front edge 1301. At the same time, a through hole 1304 is formed in the wing 130, so that the pivot shaft 135 can extend through the through hole 1304.

The inner portions of the supports 131, 132, and 133 are made of a light molded material such as soft foamed urethane, and the outer surfaces thereof are made of a rigid material such as fine urethane, in the same manner as the air spoiler wing 130. The supports 131, 132, and 133 are fixed by a proper fixing means on the trunk lid 91. The fixing means can be an adhesive or a two-sided adhesive tape; another fixing means is constituted by bolts and nuts used in such a manner that one end of each bolt is embedded in a reinforcing steel strip (not shown) fixed on the corresponding support and the other end of the bolt extends through a hole formed in the trunk lid 91 and is engaged with the corresponding nut at the inner surface of the trunk lid 91. The central support 132 is hollow, and an inner metal wall 1341 is formed thereon. The metal wall 1341 thus defines a mounting room 134 for the elevation angle adjusting mechanism 24, and a slit (not shown) is formed on the upper surface thereof.

The air spoiler wing 130 has a solar cell mechanism 4 mounted thereon. An output lead wire 45 for the solar cells is installed inside the wing 130. The solar cell mechanism 4 comprises: a number of solar cells 41 arranged in a matrix form on bottom surfaces 1641 of recesses 164 formed in the upper surface of the wing 130; an electrical connecting means (not shown) for parallel-connecting sets of series-connected solar cells, each set having a predetermined number; and a transparent cover 163 having a planar shape corresponding to the recesses 164, fitted with the openings of the recesses 164 and stopped by steps 168 formed around the recesses 164. The transparent cover 163 covers the recesses 164 and constitutes the upper surface of the wing 130.

One end of the output lead wire 45 of the solar cells 41 which is installed inside the wing 130 is connected to the electrical connecting means for parallel-series connecting the solar cells. The other end of the wire 45 is led inside the trunk room.

The solar cell 41 comprises a monocrystalline silicon cell, a polysilicon cell, a GaAs cell, a DdS cell, an amorphous silicon cell, and an organic semiconductor cell or a wet photocell. The transparent cover 163 may comprise a plastic plate (e.g., an acrylic plate or a vinyl chloride plate), or a transparent/opaque material plate (e.g., an HPR composite glass plate). The peripheral portion of the transparent cover 163 is fixed by an adhesive or screws with the steps 168 of the recesses 164 or by a combination of these fixing means. The lead wire 45 led inside the trunk lid 91 is further connected to the control circuit 8 and to a battery 61 and an accessory electrical unit 7 through another lead wire.

The elevation angle adjustment mechanism 24 comprises the photosensor 3, a drive means 252 for the wing 130, an elevation angle detecting means 255 for the wing 130, and the control circuit 8. The photosensor 3 comprises monocrystalline or amorphous solar cells which are mounted on the surface (e.g., a surface portion of the central rear portion) of the wing 130 in the same manner as in the solar cells 41. The photosensor 3 is arranged as the solar cell used for elevation angle adjustment. In this sense, the photosensor 3 need not comprise a high-power solar cell but can be a solar cell such as used for a desktop calculator. An output lead wire 35 of the photosensor 3 extends through the air spoiler wing 130 and is led inside the trunk lid 91 in the same manner as in the solar cells 41. The lead wire 35 is then connected to the control circuit 8. An upper end flange 243 of the drive means 252 for the wing 130 is fixed on the lower surface near the rear edge with respect to the intermediate portion of the wing 130. The drive means 252 is inserted in the mounting room 134 of the support 132 through the upper surface slit. The drive means comprises an arcuated driven gear 242 having a positioning ratchet 244 at the lower end thereof, and a servo motor 252 having an output shaft 253A with a worm gear 254 meshed with the driven gear 242. The drive means is thus mounted in the mounting room 134.

The elevation angle detecting means 255 for the rear spoiler wing 130 includes microswitches 256 and 257 for detecting the position of the positioning ratchet 244 of the driven gear 242 and thereby detecting the elevation angle of the rear spoiler wing 130. The elevation angle detecting means 255 is located at a predetermined location in the mounting room 134.

The operation of the air spoiler apparatus having the arrangement described above will now be described. When the vehicle is parked, electrical energy is generated from the solar cells. In this state, electric power can be supplied to the accessory electrical unit 7 powered by the battery 61 and can be used to perform other operations independently of battery power. When parked, the aerodynamic characteristics of the vehicle and need for an unobstructed rearview relative to the air spoiler wing 130 mounted on the trunk lid 91 need not be considered. In this case, only the power generating efficiency of the solar cell mechanism mounted on the air spoiler wing 130 is considered. In order to solve the problem arising when the solar cells 41 cannot be used at an optimal output, since the operating efficiency always changes in accordance with changed position of the sun, the elevation angle adjustment mechanism 24 always adjusts the elevation angle of the wing 130 with the solar cells 41 so that the air spoiler is always kept at 90°, since such an angle of sunlight incident on the solar cells 41 achieves the maximum operation of the solar cells.

The operation of the elevation angle adjustment mechanism 24 will be described hereinafter. Output from the photosensor 3 mounted on the surface of the air spoiler wing 130 is changed in accordance with a change in positional relationship between the sunlight and the vehicle (i.e., the air spoiler wing 130). When the ignition terminal of the engine key switch 62 is discriminated not to be energized, an output from the photosensor 3 is supplied to the control circuit 8 through the output lead wire 35. A microcomputer incorporated in the control circuit 8 determines whether or not the detected output is an optimal value. The servo motor 252 is driven to pivot the air spoiler wing 130 about the pivot shaft 135. In this case, the output from the photosensor 3 is fed back to automatically determine an optimal elevation angle of the air spoiler wing 130 so as to obtain the optimal operating state of the solar cells 41.

As described above, in the air spoiler apparatus having the solar cell mechanism 4 and the elevation adjustment mechanism 24, the elevation angle of the air spoiler wing 130 is automatically adjusted by the elevation angle adjustment mechanism 24 to obtain the optimal operating state of the solar cells 41. Therefore, the output from the solar cells 41 mounted on the air spoiler wing 130 can be effectively utilized when parked, without overloading the battery 61.

Figure 5:
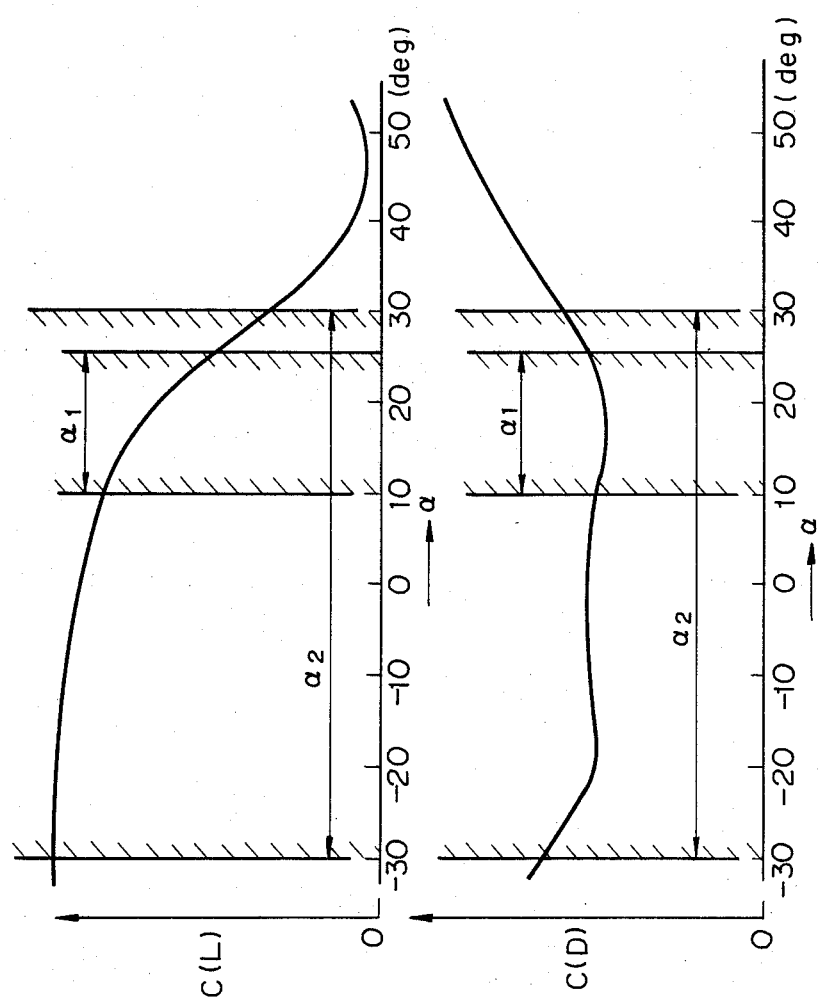
FIG. 5 is a graph showing the elevation angle as a function of the aerodynamic characteristics for explaining the operation of the air spoiler apparatus of FIG. 1.

A case will be described wherein the air spoiler is not used during parking but during stopping or low-speed driving. In this case, the vehicle speed sensor 51 generates a vehicle speed signal, and the vehicle speed discriminator 52 generates a discrimination signal in accordance with the vehicle speed signal. The aerodynamic characteristics need not be considered during stopping such as stopping for a traffic light. In addition, these characteristics need not be considered during low-speed driving either, since the air spoiler effect is small enough to be negligible. Only such problems as rearview obstruction and operating characteristics of the solar cell need be considered when the air spoiler wing 130 is mounted on the trunk lid 91. It is assumed that the rearview is substantially guaranteed so as not to interfere with the steering characteristics when the elevation angle of the air spoiler wing 130 falls within the range of ±30°. For this reason, when the elevation angle of the solar cells 41 mounted on the air spoiler wing 130 is to be adjusted by the elevation angle adjustment mechanism 24, an allowable range of elevation angles $\alpha 2$ is $-30°$ to $+30°$. In this case, a microswitch 257 is arranged to define the allowable elevation angle range, thereby optimizing the operating characteristics of the solar cells 41 and the assurance of the rearview. In other words, unlike the control during parking wherein only the operating characteristics of the solar cells 41 are considered, the best possible operating characteristics of the solar cells 41 and an assurance of an unobstructed rearview are both obtained. In this case, rearview assurance has priority over the maximum operating characteristics of the solar cells 41. Also in this case, as shown in FIG. 5, the range of elevation angles is given as $\alpha 2$ ($-30°$ to $+30°$), and the elevation angle of the wing 130 is changed within this range, thereby controlling the operation of the solar cells 41.

The operation of the air spoiler apparatus during high-speed driving will now be described. The aerodynamic characteristics and the rearview are the important factors during high-speed driving. FIG. 5 shows the drag coefficient C(D) and the lift coefficient C(L) as a function of the elevation angle $\alpha$ of the air spoiler wing 130. The rearview range is preferably given as the range of elevation angles $\alpha 2$ ($-30°$ to $+30°$). During high-speed driving, the air spoiler wing 130 is used to improve the aerodynamic characteristics as a major application and to generate power by the solar cells as a minor application. However, the optimal aerodynamic characteristics of the air spoiler wing 130 and optimal operating characteristics of the solar cells 41 cannot be simultaneously satisfied, due to a positional relationship between the vehicle and the sun and to high-speed driving. In this sense, control of the operating characteristics of the solar cells 41 is less important than improvement of the aerodynamic characteristics. Optimal control of the operating characteristics of the solar cells 41 cannot be primary, but can be secondary when control of the aerodynamic characteristics is primarily performed. When a microswitch 256 is arranged at a position corresponding to the range of elevation angles $\alpha 1$ ($+10°$ to $+25°$) and the air spoiler wing 130 is pivoted within this range, the lift coefficient C(L) can be greatly decreased while the drag coefficient C(D) can be slightly decreased since the range of angles $\alpha 1$ ($+10°$ to $+25°$) falls within the range of angles $\alpha 2$ ($-30°$ to $+30°$) to satisfy both the power generation and aerodynamic characteristics.

Figure 6:
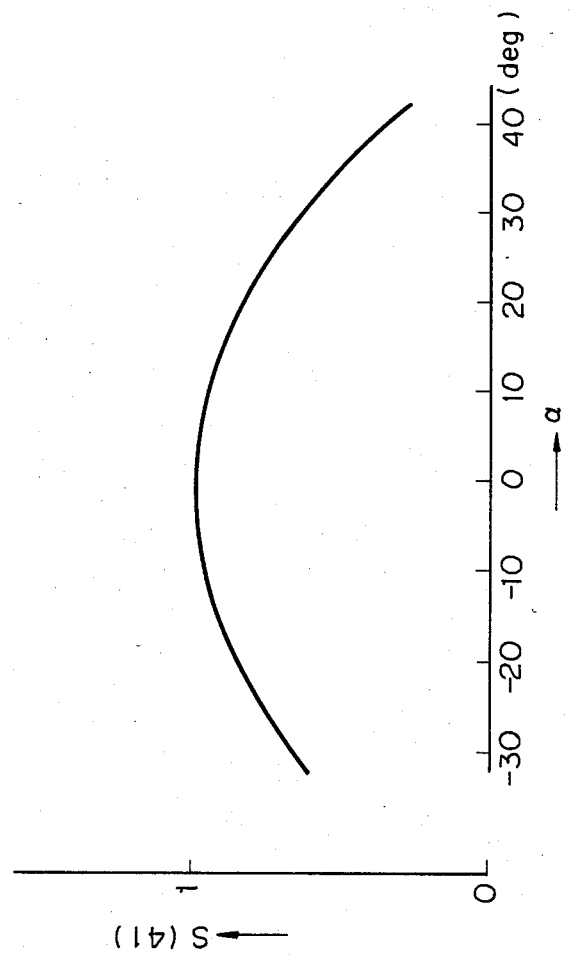
FIG. 6 is a graph showing the output of the solar cells as a function of the elevation angle.

FIG. 6 shows the output characteristics of the solar cells 41 mounted on the air spoiler wing 130 when the elevation angle thereof is changed. In this case, sunlight is incident perpendicular to the surfaces of the solar cells 41 when the elevation angle $\alpha$ is zero. Even if the elevation angle is increased or decreased, it is found that the output remains decreased.

Figure 7:
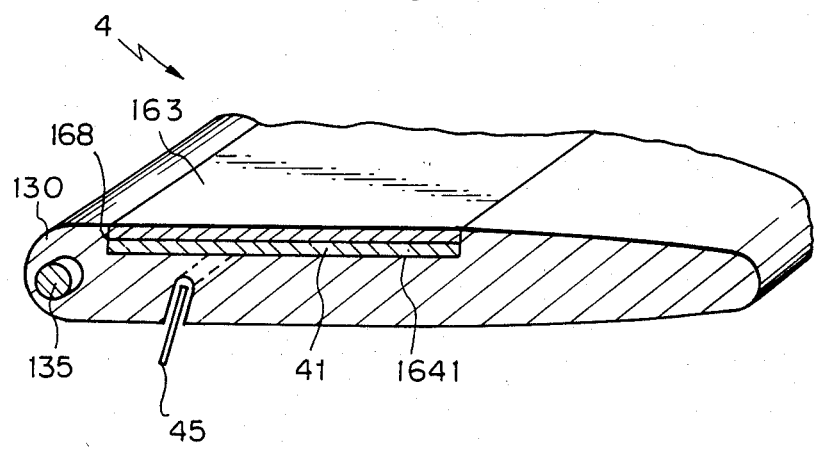
FIG. 7 is a view of another embodiment of the present invention.

FIG. 7 shows another embodiment of the present invention. This wing has a structure similar to that of the embodiment of FIG. 1 but does not have a photosensor 3. In the wing of FIG. 1, the photosensor 3 is mounted on an air spoiler wing 130, and the elevation angle of the wing 130 is changed in accordance with the output generated from the photosensor 3, thereby obtaining the optimal operating characteristics of the solar cells 41. In the wing of FIG. 7, however, the photosensor 3 is omitted. Instead, any one, or some or all of the solar cells 41 are used for elevation angle control of the air spoiler wing 130. In other words, the solar cells 41 are used as a photosensor, thereby providing power generation and control functions. In this case, an additional photosensor need not be arranged, thus allowing easy manufacture of the air spoiler wing at a lower cost.

Figure 8:
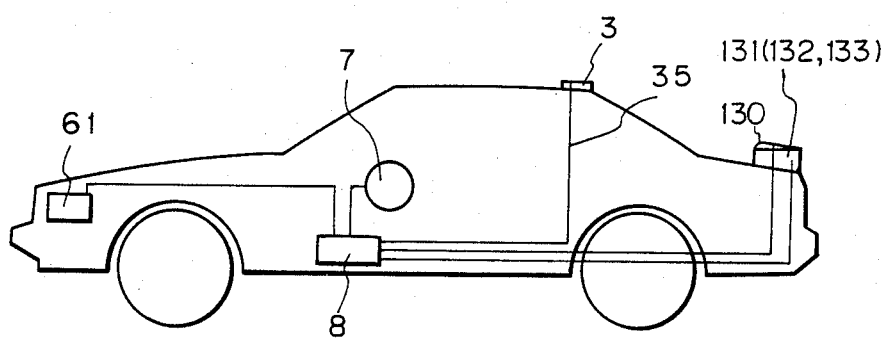
FIG. 8 is a view of still another embodiment of the present invention.

Still another embodiment of the present invention is illustrated in FIG. 8. The air spoiler apparatus of FIG. 8 has a structure similar to that of FIG. 1. However, a portion corresponding to the photosensor 3 of the apparatus shown in FIG. 1 is mounted on a surface of the vehicle roof. The output from the solar cells is changed in accordance with a change in the incident angle of the sunlight. When the output from the photosensor on the outer surface of the roof is detected, the incident angle of the sunlight can be detected, thereby changing the elevation angle of the air spoiler wing 130.

Figure 9B:
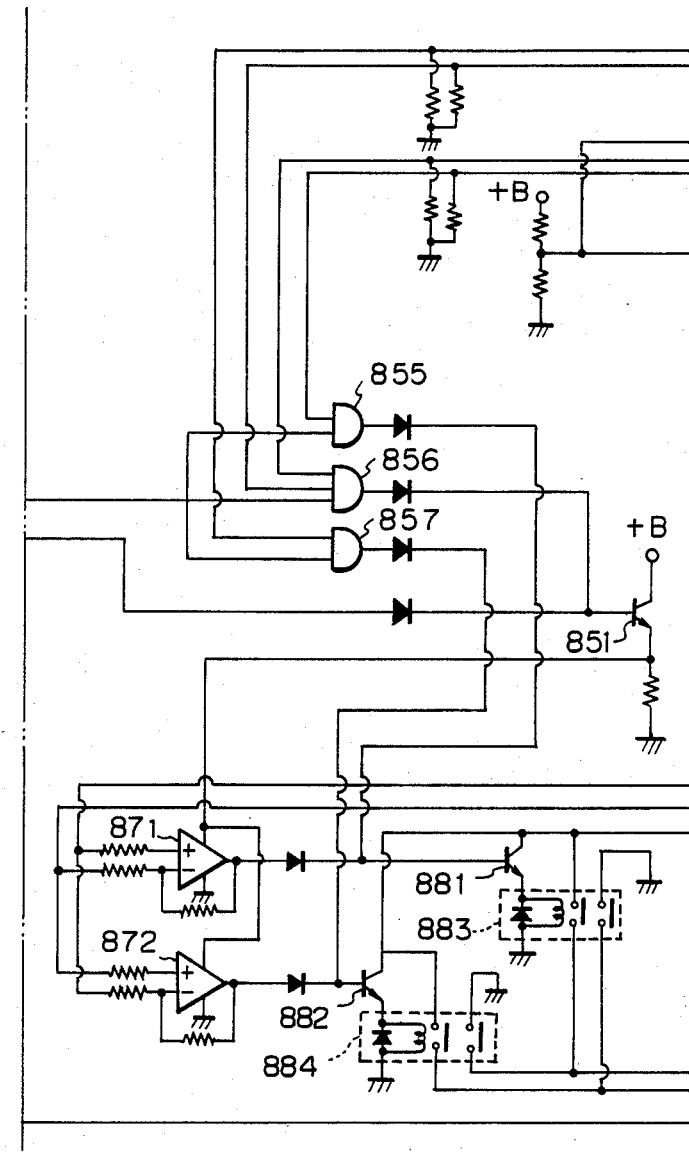

The detailed arrangement of the control circuit of the apparatus of FIG. 1 is shown in FIG. 9.

The photosensor 3 comprises a sunlight orientation sensor having two solar cells 301 and 302 inclined at an angle $2\beta$. An output is generated from output resistors 861 and 862. The control circuit also has comparators 871 and 872, transistors 881 and 882, and bipolar electromagnetic relays 883 and 884. The control circuit is connected to the battery 61 and the motor 252 as the drive means.

FIG. 10 shows the relationship between the inclination angle $\theta$ of sunlight and the difference between the output voltages of the resistors 861 and 862. The angle $\beta$ is selected to be 15°.

If the sunlight incident angle $\theta$ is larger than zero in the device shown in FIG. 9, i.e., when the angle is inclined at the side of the solar cell 302, an output from the resistor 862 is larger than that from the resistor 861, so that "voltage (862)−voltage (861)" is positive. The comparator 871 generates a logic signal "1", and the comparator 872 generates a logic signal "0". As a result, only the transistor 881 is turned ON, and the relay 883 is energized. A positive power source voltage is then applied to the negative terminal of the motor 252, and the motor 252 is rotated in a direction that will decrease the angle $\theta$ to zero, i.e., to receive sunlight perpendicular to the solar cell surface. If $\theta=0°$ is established, condition "voltage (862)−voltage (861)=0" is established, so that the comparators 871 and 872 generate logic signals "0", respectively, thereby stopping the motor 252.

When the sunlight incident angle is less than zero, i.e., when the beam is inclined at the side of the solar cell 301, condition "voltage (862)−voltage (861)<0" is established, and only the comparator 872 generates a logic signal "1". A positive power source voltage is applied to the positive terminal of the motor terminal through the transistor 882 and the relay 884. The motor 252 is rotated in the forward direction to pivot the wing so as to set the angle $\theta$ to zero. When condition $\theta=0°$ is established, the motor 252 is stopped. In this manner, the photosensor always follows the sunlight.

The microswitches or limit switches 256 and 257 are turned ON/OFF depending on the position of the positioning ratchet 244. A contact of the limit switch 256 is connected in the right-side position when the elevation angle $\alpha$ is larger than 10°. However, when the elevation angle $\alpha$ is smaller than 10°, the contact is connected in the left-side position. The contact of the limit switch 257 is connected in the right-side position when the elevation angle $\alpha$ is larger than 25°. However, when the angle $\alpha$ is smaller than 25°, the contact is connected in the left-side position. An output from the velocity sensor or speedometer 51 is compared by a comparator 521 in the velocity discriminator 52 with a preset value. When the comparator 521 determines that the running mode is high-speed, the comparator 521 supplies a logic signal "1" to an AND gate 811. The AND gate 811 generates a logic signal "1" only when the key switch 62 is turned ON and the high-speed running mode is set; otherwise, a NOT circuit 812 generates a logic signal "1". Among AND gates 855, 856, and 857, the AND gate 855 generates a logic signal "1" only when the high-speed running mode is set and the elevation angle $\alpha$ is less than 10°. The AND gate 856 generates a logic signal "1" only when the high-speed running mode is set and the elevation angle $\alpha$ satisfies the range of $10° < \alpha < 25°$. The AND gate 857 generates a logic signal "1" only when the high-speed running mode is set and the elevation angle $\alpha$ is larger than 25°. A transistor 851 is turned ON when the elevation angle falls within the range of $10° < \alpha < 25°$ or the operating mode excludes the high-speed running mode to supply the power source voltage to the comparators 871 and 872. The transistor 881 is turned ON when the elevation angle $\alpha$ is less than 10° during high-speed running or the comparator 871 generates the logic signal "1", thereby rotating the motor 252 in the reverse direction through the relay 883. The transistor 882 is turned ON when the elevation angle $\alpha$ is larger than 25° during high-speed running or when the comparator 872 generates the logic signal "1", thereby rotating the motor 252 in the forward direction through the relay 884.

The above operations are summarized as follows:

(1) The motor is operated to follow the sunlight in response to the output from the photosensor 3 in a mode excluding the high-speed running mode.

(2) The motor is operated to increase the elevation angle $\alpha$ to be more than 10° when the elevation angle $\alpha$ is less than 10° during high-speed running.

(3) The motor is operated to decrease the elevation angle $\alpha$ to be less than 25° when the elevation angle $\alpha$ is larger than 25° during high-speed running.

(4) The motor is operated to follow the sunlight when the elevation angle falls within the range of $10° < \alpha < 25°$ during high-speed running.

It should be noted that a selection switch 813 is used to determine the output from the solar cells 41 for charging the battery 61 or operating the accessory electrical unit 7.

In the apparatus shown in FIG. 9, a power improvement effect is the primary objective during high-speed running. In the mode excluding the high-speed running mode, power generation of the solar cells is the primary objective.

Figure 11A:
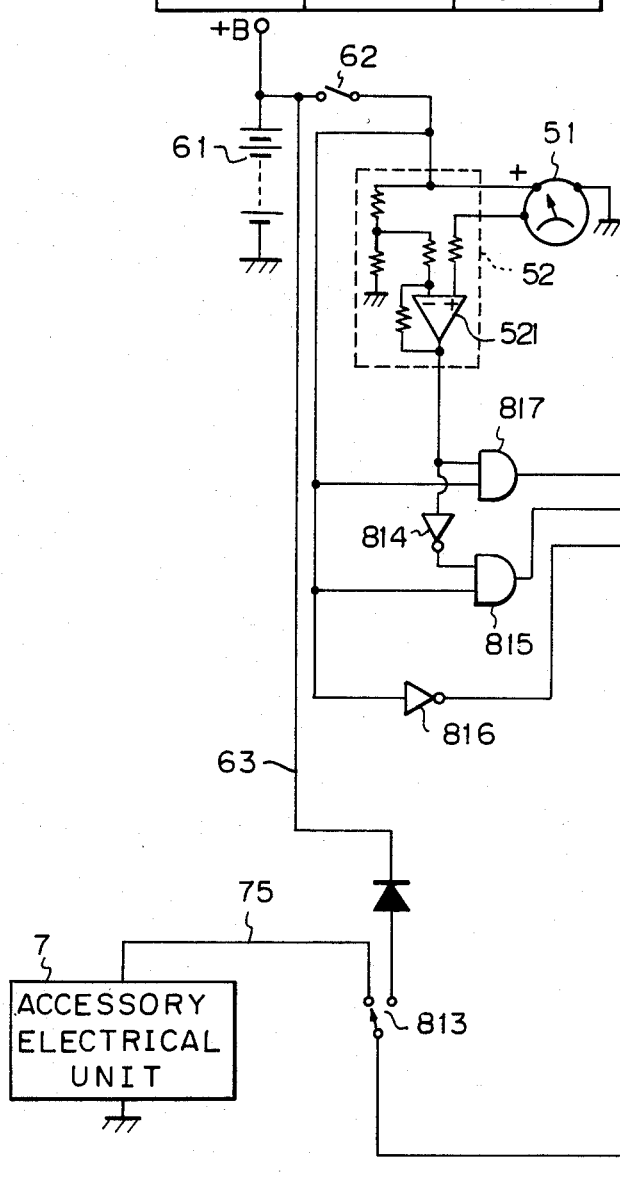
FIGS. 11A–11C are a circuit diagram showing another arrangement of a control circuit according to the present invention.
Figure 11B:
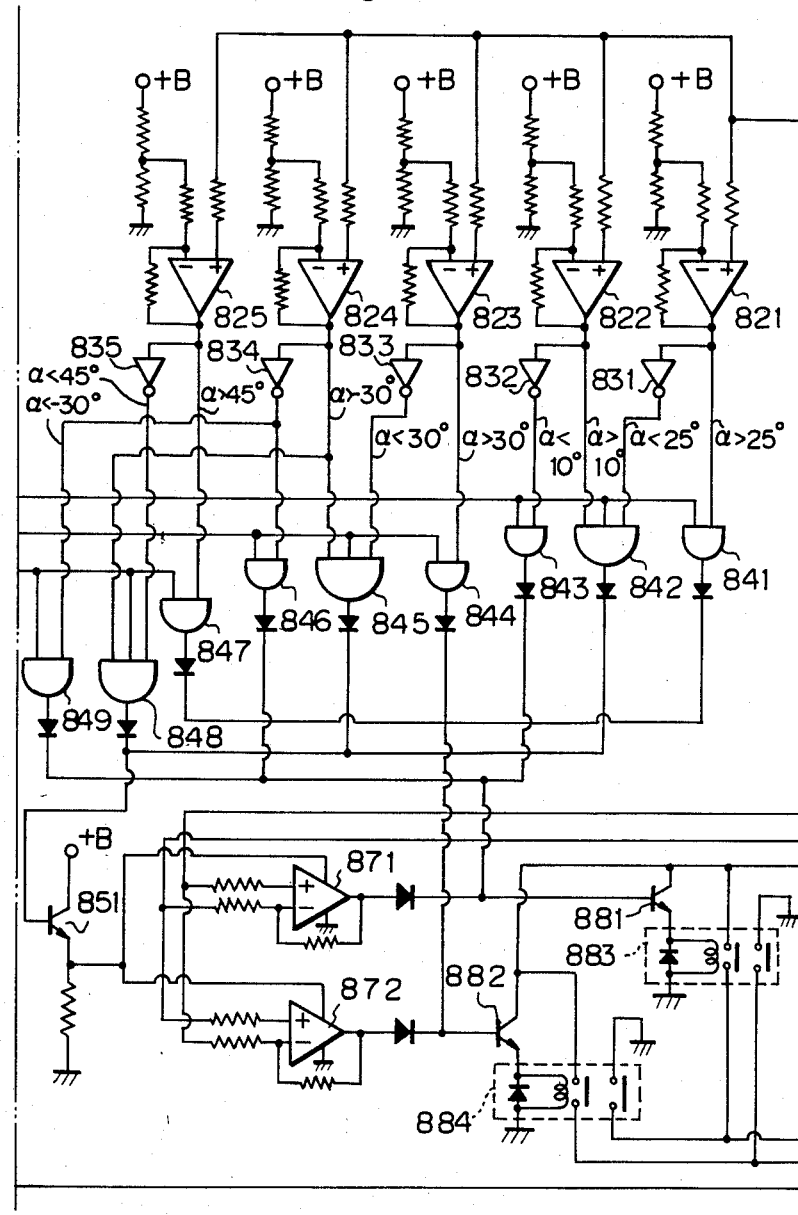
Figure 11C:
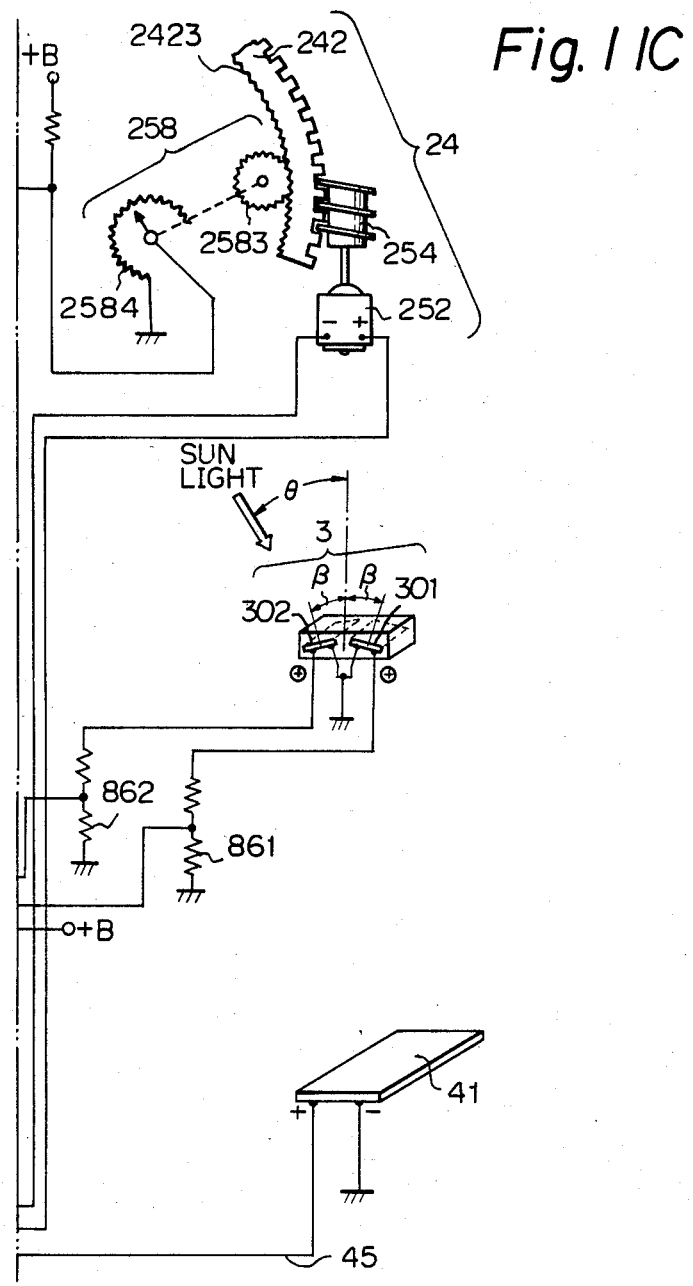

FIG. 11 shows another arrangement of the control circuit. The circuit of FIG. 11 is substantially the same as that of FIG. 9. In the circuit in FIG. 11, an elevation angle detective device 258 is provided which is formed by a gear structure 2423 having small pitch on the rear surface of the gear 242 and a gear wheel 2583 which is engaged with the gear structure 2423 and coupled to a potentiometer 2584 for detecting correctly the elevation angle. An output from the potentiometer 2584 is supplied to comparators 821 to 825. The comparators 821 to 825 generate logic signals "1" when conditions $\alpha > 25°$, $\alpha > 10°$, $\alpha > 30°$, $\alpha > -30°$, and $\alpha > 45°$ are established, respectively. NOT gates 831 to 835 generate logic signals "1" when conditions $\alpha < 25°$, $\alpha < 10°$, $\alpha < 30°$, $\alpha < -30°$, and $\alpha < 45°$ are established, respectively.

An AND gate 813 generates a logic signal "1" when the key switch is turned ON and the high-speed running mode is set. An AND gate 815 generates a logic signal "1" when the key switch is turned ON and a mode (e.g., low-speed running or stopping) excluding the high-speed running mode is set. A NOT gate 816 generats a logic signal "1" when the key switch is turned OFF. AND gates 841 to 849 are used for conditional decision and to generate logic signals "1" in the following conditions:

(i) if $\alpha > 25°$ during high-speed running for the AND gate 841

(ii) if $10° < \alpha < 25°$ during high-speed running for the AND gate 842

(iii) if $\alpha < 10°$ during high-speed running for the AND gate 843

(iv) if $\alpha > 30°$ for the AND gate 844 when the key switch is turned ON and a mode excluding the high-speed running mode is set (v) if $-30° < \alpha < 30°$ for the AND gate 845 when the key switch is turned ON and a mode excluding the high-speed running mode is set (vi) if $\alpha < -30°$ for the AND gate 846 when the key switch is turned ON and a mode excluding the high-speed running mode is set (vii) if $\alpha > 45°$ for the AND gate 847 when the key switch is turned OFF (viii) if $-30° < \alpha < 45°$ for the AND gate 848 when the key switch is turned OFF (ix) if $\alpha < -30°$ for the AND gate 849 when the key switch is turned OFF.

When conditions (i), (iv), and (vii) are established, the transistor 884 is turned ON to rotate the motor 252 in the forward direction. When conditions (ii), (v), and (viii) are established, the transistor 851 is turned ON to energize the comparators 871 and 872 to drive the motor 252 so as to follow the sunlight in accordance with the output from the photosensor 3. When conditions (iii), (vi), and (ix) are established, the transistor 881 is turned ON to rotate the motor 252 in the reverse direction.

The control operations described above are summarized as follows:

(1) The elevating angle can be controlled to optimize the solar cell output within the elevation angle range of $10° < \alpha < 25°$, i.e., within the range for providing the largest power improvement effect during high-speed running.

(2) The elevation angle can be controlled to optimize the solar cell output within the range of $-30° < \alpha < 30°$, i.e., within the range for which the rearview is not obstructed during low-speed running and stopping.

The elevation angle can be controlled to maximize the solar cell output within the range of $-30 < \alpha < 45°$ when the key switch is kept OFF. The range of the elevation angles need not be limited to a specific range. However, when a margin of the pivotal movement of the wing is given as described above, the air spoiler apparatus can be easily manufactured. Other operations of the circuit shown in FIG. 11 are the same as those in FIG. 9.

We claim:

1. An air spoiler apparatus with solar cells for a vehicle, comprising:
   air spoiler means, having a wing-shaped cross-section, for improving aerodynamic characteristics of said vehicle, mounted on an outer surface of a vehicle body;
   at least one solar cell mounted on an upper surface of said air spoiler means to generate power upon reception of sunlight;
   running detection means for detecting a predetermined running state of the vehicle and providing a signal indicative thereof; and
   elevation angle adjusting means for changing an elevation angle of said air spoiler means in directions that will optimize power generation efficiency of said solar cells within select angular ranges, said ranges determined by the running state of the vehicle.

2. An apparatus according to claim 1, wherein said elevation angle adjusting means comprises:
   photodetecting means for detecting a direction of sunlight on the outer surface of the vehicle body; and
   control means for supplying an elevation angle adjustment control signal to said elevation angle adjusting means in accordance with a detection signal generated from said photodetecting means.

3. An apparatus according to claim 2, wherein said elevation angle adjustment means comprises motor means for driving a wing, a drive shaft, a worm gear, an arcuated driven gear having a positioning ratchet, and an elevation angle detecting means.

4. An according to claim 3, wherein said elevation angle detecting means comprises a plurality of microswitches for detecting the position of said positioning ratchet of said arcuated driven gear.

5. An apparatus according to claim 2, wherein a plurality of solar cells are provided on the spoiler means, the arrangement of said solar cells is such that a number of solar cells are arranged in a matrix form on bottom surfaces of recesses formed in an upper surface of the wing-shaped air spoiler means.

6. An apparatus according to claim 2, wherein said photodetecting means comprises solar cells mounted on a surface of the wing-shaped air spoiler means.

* * * * *